United States Patent Office 2,995,934
Patented Aug. 15, 1961

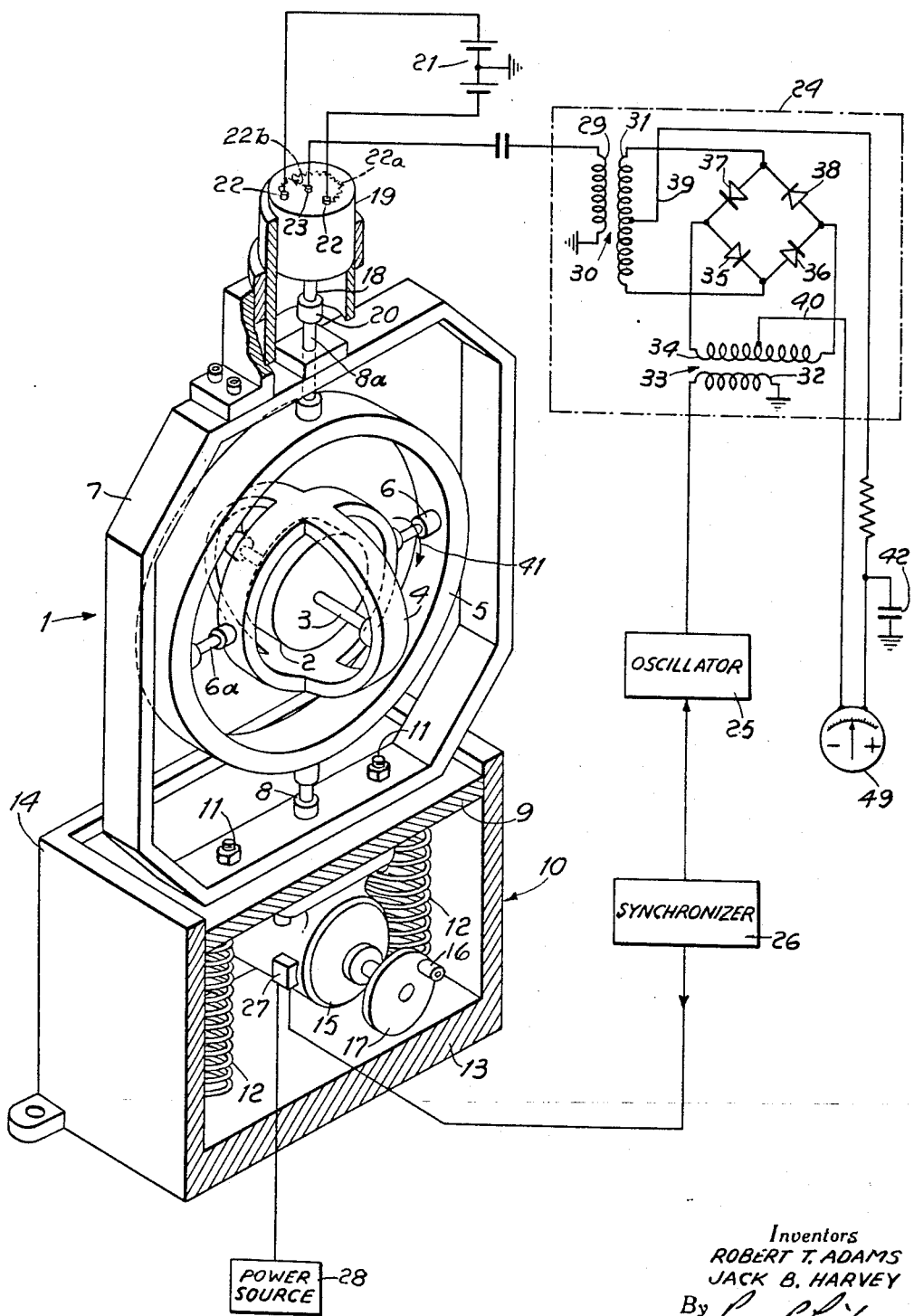

2,995,934
APPARATUS TO MEASURE UNBALANCE
IN GYROSCOPES
Robert T. Adams, Short Hills, N.J., and Jack B. Harvey, New York, N.Y., assignors to International Telephone and Telegraph Corporation, Nutley, N.J., a corporation of Maryland
Filed Mar. 19, 1958, Ser. No. 722,608
5 Claims. (Cl. 73—462)

This invention relates to gyroscopes and more particularly to systems for detecting and/or measuring axial unbalance that may be present in a gyroscope.

In practically all gyroscopes there is present certain mass unbalance due to loose fits in bearings, friction and uneven heating of parts which tend to shift the center of gravity of the rotor and thereby cause a torque to be exerted serving to rotate the shaft of the rotor about an axis perpendicular to the rotor spin axis. This torque causes precession of the rotor about an axis perpendicular to both the torque axis and the spin axis and thereby introduces error into the gyro indication. Even though this error can be held within small limits because of precision of manufacture, the requirements for accuracy in a gyroscope, especially where used for navigation systems, such as inertial guidance systems, are so severe that even the smallest error cannot be tolerated. Furthermore, this error due to unbalance may vary due to thermal warping of the gyro as well as other factors. If some way can be found to eliminate this marginal or varying error or detect and/or measure it and therefore allow correction to be made or to compensate for it, then a much higher standard of navigational accuracy can be achieved.

It is therefore an object of this invention to provide a system for detecting and/or measuring axial unbalance that may be present in a gyroscope.

It is a further object to provide means in conventional navigation systems, such as inertial guidance systems, to utilize the detection of any axial unbalance in gyroscopes to immediately correct or compensate such unbalance.

A feature of this invention is a system for detecting the axial unbalance of a gyroscope which consists of moving the gyroscope to and fro along a single axis to cause cyclic precision of the gyroscope if any unbalance exists. By measuring this cyclic precession to obtain a signal proportional to the magnitude and sense of this cyclic precession, and combining it with a reference signal, an error signal is obtained which is proportional to the magnitude and sense of any axial unbalance present in the gyroscope. This error signal may then be used to compensate the effects of the unbalance.

The above-mentioned and other features and objects of this invention and the manner of attaining them will become more apparent by reference to the following description taken in conjunction with the drawing, the single figure of which illustrates an embodiment of our invention.

The sole figure of the drawing is an isometric view of a gyroscope with vibrating means and transducing means coupled thereto, and electrical circuitry shown in block and circuit diagram form. There is shown a gyroscope 1, which consists of a spin rotor 2 mounted on a spin shaft 3, which is coupled to and free to rotate within a gimbal 4. The gimbal 4 is coupled to a second gimbal 5 by shafts 6 and 6a. Gimbal 5 is free to rotate in the main gyroscope housing 7 by shafts 8 and 8a. The housing 7 is rigidly secured to a table 9 of a vibration unit 10 by bolts and nuts 11. The table 9 is mounted on springs 12, which are fastened to a base 13. The table 9 is constrained to move only in the vertical direction by side and rear walls 14. A motor 15 is mounted to the under side of the table 9 to impart thereto a vertical reciprocating or vibrating movement because of an unbalanced weight 16, which is attached to the rim of a plate 17 that is rotated by the motor 15.

If any axial unbalance is present in the gyroscope, the vertical reciprocating movement of the gyroscope will cause a cyclic torque at the driving frequency to be exercised about the axis 6—6a, which is perpendicular to the spin shaft 3. This torque will in accordance with the gyroscope principles cause the gyroscope to precess cyclically at the driving frequency about the axis 8—8a, which is perpendicular to both the spin axis 3 and the torque axis 6—6a. Where the gyroscope operation can be seen, this cyclic precessing can be observed. Different arrangements may be used to measure this detected unbalance. By way of example, a shaft 18 of a potentiometer 19 may be fastened to the shaft 8a of the gyroscope by a coupling 20. A source of direct current 21 is coupled to the end terminals 22 of the resistance winding 22a of the potentiometer 19. The movable wiper arm 22b of the potentiometer 19 is rotated by the shaft 18 and is connected to the mid-terminal 23. Terminal 23 is coupled to the input of a balanced modulator 24 operating as a synchronous detector as will be explained later on. An oscillator 25 is coupled to the balanced modulator 24, and a synchronizer 26 is coupled between the oscillator 25 and a motor control unit 27. A power source 28 for energizing the motor 15 is also connected to the motor control unit 27. The output of the balanced modulator is fed into a direct current voltmeter 29.

If the gyroscope 1 is moved up and down in a reciprocating motion of known magnitude and velocity, a reciprocating or cyclic precession of the gyroscope will be observed if any axial mass unbalance exists in the gyroscope. The term axial mass unbalance used herein means that the center of mass of the gyroscope is shifted along the spin axis so that the center of mass is no longer in line with the gimbal axis 6—6a, whereby torque is introduced which causes precession. The magnitude of the unbalance present is directly proportional to the magnitude of the precession and inversely proportional to the acceleration by the equation $$\text{Unbalance} = K \frac{\text{precession}}{\text{acceleration}}$$

where K is a constant, in this case the angular momentum of the gyroscope. The phase of the precession as compared with the phase of the motion indicates the direction or sense of the unbalance.

Operation of the power source 28 will energize the motor 15 to rotate at a speed, for example, of three revolutions per second. This speed is chosen as an example of the most favorable rotation rate of the motor which will permit the largest vertical movement that can be imparted to the gyro and yet give a low second order unbalance which is due to the third derivative of the upward travel of the table. The third order derivative is the derivative of the acceleration derived as follows. If we say that sin $\omega t$ expresses the position of the table at any time, then $\omega \cos \omega t$ is equal to the velocity of the table and, in this case, since the table is constrained, only in the vertical direction. The acceleration is equal to the second derivative $$-\omega^2 \sin \omega t$$

and $$\frac{da}{dt} = -\omega^3 \cos \omega t$$

that is, the third derivative. The acceleration produces a force on the gyro according to the expression $f = ma$. If the bearings supporting the gyroscope rotor are displaced from the horizontal, then the force acting on the bearings upwards will cause a deflection or bowing of the gyro spin shaft which, in turn displaces the center of gravity producing horizontal and vertical components of force. The horizontal force produces the mass unbalance, hence, the precession. The frequency or spin of the motor is kept to a low figure, in this case, three r.p.m. so that the third derivative should be kept low. Low second order unbalance may be defined as the unbalance due to the acceleration forces and maintained at a low quantity by operating the motor at a low speed. As the motor 15 rotates, the unbalanced weight 16 will impart a vertical reciprocating motion to the gyroscope 1 which will be sinusoidal at a frequency equal to the rotation rate of the motor 15. The presence of any axial mass unbalance in the gyro system in conjunction with the vertical reciprocating motion will cause a torque about the axis 6—6a, which in turn will set up a resisting torque within the gyroscope that will cause the gyroscope to precess about the axis 8—8a. The precession will be sinusoidal in agreement with the vibratory movement of the gyroscope. While the shaking of the gyro is shown to be a reciprocating motion, it will be obvious that any to and fro motion may be employed, thus resulting in a corresponding cyclic precession in case of mass unbalance.

The precessional rotation of the shaft 8a will turn the shaft 18 of the potentiometer 19, rotating the wiper arm 22b about either side of the mid-point of the resistance winding of the potentiometer, which rotation will also be sinusoidal in character. The sinusoidal change of resistance will generate a sinusoidal current flow varying in amplitude and phase directly in accordance with the precession. The sinusoidal output current of the potentiometer 19 is then fed into the balanced modulator 24 through the primary 29 of an input transformer 30 having a split secondary 31 with out-of-phase windings. The balanced modulator 24 is of the type, for example, described in the publication "Radio Direction Finders" by Donald S. Bond, published by McGraw-Hill Book Company, Incorporated, 1944, on pages 177 and 178. It is to be understood that the same circuit that is used for modulation can be used equally well for demodulation when so required. A reference sinusoidal signal of the same frequency as the rotation rate of the motor 15 and of large amplitude is generated by the oscillator 25 and fed into a primary 32 of a second transformer 33 having a split secondary 34 with in-phase windings. The four rectifier diodes 35, 36, 37 and 38 are arranged in ring fashion with the secondary leads of the transformer 30 connected to the junction of diodes 37 and 38 and the junction of diodes 35 and 36. The secondary leads of transformer 33 are connected to the junction of diodes 35 and 37 and the junction of diodes 36 and 38. The midpoint terminal 39 of secondary 31 of transformer 30 and the mid-point terminal 40 of secondary 34 of transformer 33 constitute the output terminals of the balanced modulator 24.

The synchronizer 26 triggers the oscillator 25 and the motor 15. When the phase of the reference signal is positive, diodes 35 and 36 conduct and diodes 37 and 38 do not conduct. If now the output of the potentiometer 19 is also first positive and then negative, then the signal induced in the first half of the secondary 30 will be in phase and the signal in the second half will be 180 degrees out of phase with the incoming signal. Therefore, the current in the 180-degree out-of-phase half of the secondary 30 will flow through the conducting diodes 35 and 36, and there will be no flow of current from the in-phase half of the secondary 30. Thus the output of the balanced modulator 24 in the first half cycle will be negative. During the negative portion of the cycle in the transformer 33, diodes 37 and 38 will be conducting, and diodes 35 and 36 will be nonconducting. Therefore, the negative portion of the signal cycle in the in-phase half of secondary 31 will constitute the output of the balanced modulator for that portion of the cycle, since there will be no output from the other half of secondary 31.

It is evident that if the error signal is in phase with the reference signal, then the output of the balanced modulator 24 will be negative and the amplitude of the signal will be directly proportional to the amplitude of the error signal. If the error signal is 180 degrees out of phase with the reference signal, the output of the balanced modulator will be positive. The phase of the potentiometer output voltage will indicate the direction of the axial unbalance. Suppose the rotor to be spinning counterclockwise and the precession occurs counterclockwise on the upward movement of the vibration cycle. This would indicate that an unbalanced force exists which is converted into a torque that tends to rotate the rotor clockwise about the axis 6—6a as shown by the direction of the arrow 41. The counterclockwise precession turns the potentiometer wiper arm from mid position to the positive polarity terminal. On the downward movement the precession and potentiometer rotation would be reversed. There would then result as the output of the potentiometer a sinusoidal current first positive and then negative which after detection in the balanced modulator would indicate negative on the direct current voltmeter 49. A positive reading on the voltmeter would indicate an unbalance on the opposite side of the gyroscope. The amplitude of the signal will show a magnitude of the unbalance. Both the amplitude and the phase of the error signal can be read directly on the direct current voltmeter 49. The resistor-capacitor network 42 is a low pass filter to bypass any alternating current components that have passed through the modulator 24.

While this invention provides for the detection of the magnitude and direction or sense of axial unbalance in a gyroscope, it is evident that it can be used to detect and immediately correct any such unbalance. This is of prime importance where the gyro is used in navigational systems as, for example, inertial navigation. In such a case the balanced modulator and voltmeter would not be necessary. It is to be understood that the linear potentiometer and balanced modulator described in this embodiment are used only by way of illustration and any other suitable means to detect the gyroscope precession may be used, such as synchros and other forms of detectors.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system for determining whether or not a gyroscope contains any axial mass unbalance, comprising means to subject said gyroscope to a vibratory motion of a given frequency and amplitude longitudinally of a given axis thereof, said given axis being perpendicular to the spin axis of said gyroscope, and means to detect any cyclic precession produced in the gyroscope about said given axis in response to said vibratory motion, the magnitude of the cyclic precession being indicative of the magnitude of axial mass unbalance present in the gyroscope.

2. A system for determining the magnitude and sense of axial mass unbalance present in a gyroscope, comprising means to subject the gyroscope to a vibratory motion of a given frequency and amplitude longitudinally of a given axis thereof, said given axis being perpendicular to the spin axis of said gyroscope, means to detect any cyclic precession produced in the gyroscope about said given axis resulting from the accelerations of the vibratory movement, means to measure the magnitude of the cyclic precession as indicative of the magnitude of the unbalance and to compare the phase of the cyclic precession with the phase of the vibratory motion to determine the sense of the unbalance.

3. A system for detecting the axial unbalance of a gyroscope comprising a gyroscope, means for imparting to said gyroscope a cyclic vibration along a given axis at a given frequency and amplitude, said given axis being perpendicular to the spin axis of said gyroscope, means to transduce any resulting cyclic precession of said gyroscope about said given axis into a signal of said given frequency which is related to the magnitude and sense of said cyclic precession, means to generate a cyclic reference signal of said given frequency in synchronization with said vibration, and means to compare said signal and said reference signal to obtain a signal proportional in amplitude to the magnitude of axial unbalance in said gyroscope.

4. A system for detecting axial unbalance of a gyroscope comprising means to vibrate the gyroscope along a given axis thereof at a given frequency and amplitude, said given axis being perpendicular to the spin axis of said gyroscope to cause cyclic precession of said gyroscope at said given frequency about said given axis, means to detect the presence of precession in said gyroscope and transduce said precession into a signal of said given frequency which is related to the magnitude and sense of said precession, means to generate a reference signal of said given frequency in synchronization with said vibration and means to compare said signal and said reference signal to obtain an indication of the magnitude of axial unbalance in said gyroscope, and an indication of the sense of said unbalance.

5. A system for detecting the axial unbalance of a gyroscope which comprises a gyroscope, a vibration device, means for coupling a shaft of said gyroscope to said vibration device to impart to said gyroscope a cyclic vibration along the axis of said shaft at a given frequency to cause precession of the gyroscope about said shaft should said gyroscope be unbalanced axially, said shaft being perpendicular to the spin axis of said gyroscope, a potentiometer, means coupling the shaft of said potentiometer to said shaft of said gyroscope, a source of direct current, means coupling said source of direct current to said potentiometer to derive from said potentiometer a signal of said given frequency which is related to the magnitude and sense of said precession, a balanced modulator, a source of oscillating energy at said given frequency, in synchronization with said cyclic vibration, means coupling said source of oscillating energy and said signal to said balanced modulator to derive therefrom a signal proportional in amplitude to the magnitude of said axial unbalance and of a sense related to the sense of said axial unbalance.

References Cited in the file of this patent

UNITED STATES PATENTS

| | | |
|---|---|---|
| 1,374,162 | Meitner | Apr. 5, 1921 |
| 2,697,343 | Hirtreiter | Dec. 21, 1954 |

FOREIGN PATENTS

| | | |
|---|---|---|
| 565,382 | Great Britain | Nov. 8, 1944 |